United States Patent

[11] 3,596,974

| [72] | Inventor | John Q. Adams |
| | | Clark, Mo. 63243 |
| [21] | Appl. No. | 805,709 |
| [22] | Filed | Mar. 10, 1969 |
| [45] | Patented | Aug. 3, 1971 |

[54] AIR CURRENT DEFLECTING DEVICE
6 Claims, 6 Drawing Figs.

[52] U.S. Cl............................................. 296/1 S, 296/91
[51] Int. Cl............................................. B62d 37/02
[50] Field of Search.............................. 296/15, 91; D14/6

[56] References Cited
UNITED STATES PATENTS

| 2,644,716 | 7/1953 | McVicker | 296/91 |
| 2,863,695 | 12/1958 | Stamm | 296/1 |
| 3,000,663 | 9/1961 | Lucchesi | 296/1 |
| 3,309,131 | 3/1967 | Saunders | 296/1 |
| 3,328,074 | 6/1967 | Van Rossem | 296/1 X |
| 3,348,873 | 10/1967 | Saunders | 296/1 |
| 3,368,841 | 2/1968 | Grau | 296/91 |
| 3,425,740 | 2/1969 | DeVaughn | 296/1 |
| 3,484,130 | 12/1969 | Read | 296/1 |

FOREIGN PATENTS

| 1,281,065 | 11/1961 | France | 296/1 |

*Primary Examiner*—Benjamin Hersh
*Assistant Examiner*—Leslie J. Paperner
*Attorney*—Zarley, McKee & Thomte ABSTRACT: An air current deflecting device for use with a vehicle pulling a trailer or the like. An elongated transparent deflecting shield is pivotally secured to a pair of spaced-apart support members which are detachably secured to the vehicle so as to position the deflecting shield above the roof of the vehicle. The shield includes a face portion having a length approximately equal to the width of the vehicle roof and having wing portions at opposite ends thereof which extend downwardly and rearwardly therefrom. The shield is selectively movable from a position wherein the leading edge of the face portion is positioned below and forwardly of the trailing edge of the face portion so that the inclined face portion will deflect air currents passing over the vehicle roof upwardly and rearwardly above the forward end of the trailer. The lower or leading edge of the shield is positioned above the vehicle roof to permit a certain amount of air to pass therebelow to eliminate the formation of a vacuum pocket rearwardly of the shield means. The shield may also be selectively pivoted to an inoperative position wherein the face portion of the shield is substantially parallel to the roof of the vehicle.

PATENTED AUG 3 1971
3,596,974
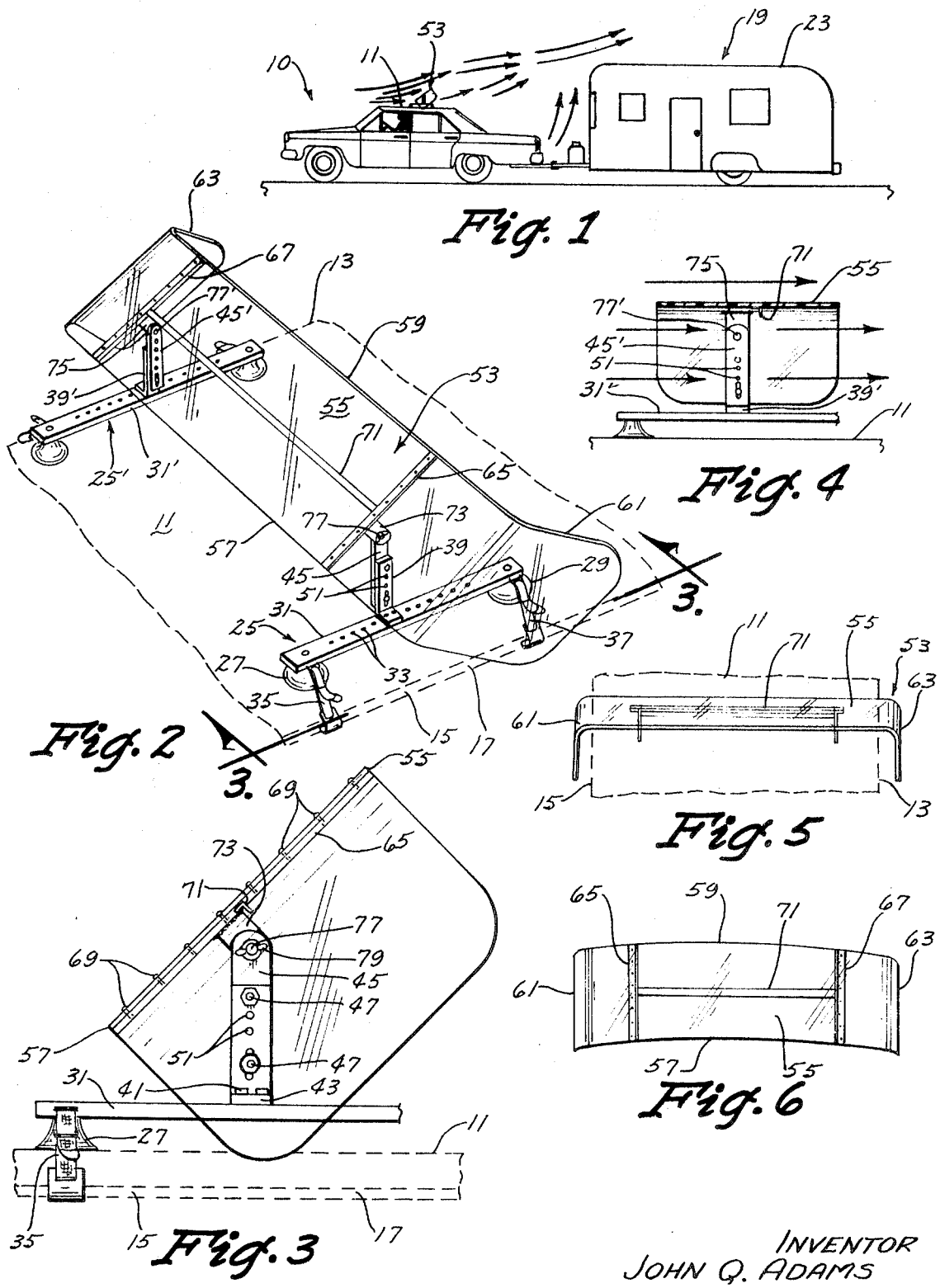
INVENTOR
JOHN Q. ADAMS
BY
Zarley, McKee & Thomte
ATTORNEYS

AIR CURRENT DEFLECTING DEVICE

A vehicle operator frequently experiences dome difficulty in handling and operating the vehicle when the same is being used to tow a trailer therebehind. This difficulty is largely due to the air currents hitting the front portion of the trailer since the trailer usually has a large front portion which is exposed above the vehicle roof. These air currents create a large wind resistance against the trailer which adversely affects the control of the vehicle and adds strain to the vehicle transmission.

Therefore, it is a principal object of this invention to provide an air current deflecting device which may be mounted on the roof of a vehicle to deflect the air currents passing thereover to reduce the wind resistance against the forward portion of the trailer.

A further object of this invention is to provide an air current deflecting device including a shield means selectively pivotally secured to a support means which is adapted to be detachable secured to a vehicle roof.

A further object of this invention is to provide an air current deflecting device of the type described herein which is constructed of a clear transparent material so as to provide an aesthetic appearance.

A still further object of this invention is to provide an air current deflecting device which may be pivotally moved from an inoperative position to an operative position.

A still further object of this invention is to provide an air current deflecting device having brace means associated therewith to prevent the device from becoming broken.

A still further object of this invention is to provide an air current deflecting device which prevents a vacuum pocket from being formed adjacent the rearward side thereof.

A still further object of this invention is to provide an air current deflecting device which is easily and adjustably secured to the vehicle above the roof thereof.

A still further object of this invention is to provide an air current deflecting device which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a side view illustrating an automobile pulling a trailer, the device of this invention being mounted on the automobile;

FIG. 2 is a front perspective view of the device of this invention, the broken lines representing the top portion of the automobile;

FIG. 3 is a side view of the device as seen on lines 3–3 of FIG. 2;

FIG. 4 is a sectional view of the device illustrating the same in an inoperative position;

FIG. 5 is a top view of the device; and

FIG. 6 is a front view of the device.

The numeral 10 generally designates a conventional passenger vehicle having a roof 11 with opposite sides 13 and 15. The vehicle is provided with rain gutters at opposite sides of the roof 11 and FIG. 2 illustrates the gutter at one side thereof generally designated by the reference numeral 17. The numeral 19 generally designates a trailer such as a mobile home or the like having a front portion 21 and a roof 23.

A pair of supports 25 and 25' are detachably mounted on the roof 11 of the vehicle as illustrated in FIG. 2. Inasmuch as supports 25 and 25' are identical, only support 25 will be described with identical structure on support 25' being indicated by "'." Support 25 includes a pair of spaced-apart suction cup members 27 and 29 having a bar 31 secured thereto and extending therebetween as illustrated in FIG. 2. Bar 31 is provided with a plurality of openings 33 formed therein for a purpose to be described later. Bar 31 is provided with connectors 35 and 37 at the forward and rearward ends thereof which are of conventional design and which are adapted to extend over the gutter 17 to maintain the support 25 on the roof 11.

A post 39 is selectively detachably secured to the bar 31 by means of bolts 41 extending through flange 43 and through the openings 33 in bar 31. A post 45 is adjustably secured to the post 39 by means of bolts 47 extending through openings formed therein and through the openings 51 formed in post 39. The relationship of post 45 with respect to post 39 may be easily changed by simply inserting the bolt 47 in different openings therein to permit the post 45 to be raised or lowered with respect to the post 39.

The numeral 53 generally refers to a deflecting shield constructed of a clear transparent material such as Plexiglas or other suitable plastic material. Shield 53 includes a substantially flat base portion 55 having a leading edge 57 and a trailing edge 59. Shield 53 also includes wing portions 61 and 63 which extend rearwardly from opposite ends of the face portion 55 as clearly illustrated in FIGS. 2—6. A pair of spaced-apart braces 65 and 67 are secured to face portion 55 at the rearward side thereof by rivets 69 or the like extending therethrough. A brace 71 is secured to the braces 65 and 67 and extends therebetween adjacent the rearward side of the face portion 55 to provide strength and rigidity to the device. Braces 65 and 67 have ears 73 and 75 secured thereto and extending therefrom to facilitate the pivotal connection of the shield 53 to the posts 45 and 45'. As illustrated in FIG. 3, a bolt 77 extends through ear 73 and post 45 and is maintained therein by a wing nut 79. Likewise, ear 75 is pivotally connected to the upper end of post 45' by a bolt 77'.

It is recommended that the length of face portion 55 be approximately equal to the width of the roof 11 so that the wings 61 and 63 extend rearwardly with respect to the side edges 13 and 15 respectfully. The normal method of operation is as follows: The supports 25 and 25' are detachably secured to the vehicle so that the shield 53 is positioned slightly rearwardly of the center of the roof as illustrated in FIG. 1. The exact position of the supports 25 and 25' with respect to the roof 11 will depend upon the configuration of the vehicle windshield and roof and will require some experimentation to determine the proper position. When the vehicle is not being used to pull a trailer, the shield 53 will be placed in the position illustrated in FIG. 4 so that the face portion 55 is substantially parallel to the roof 11 to permit the air to freely pass over the face portion 55 as well as beneath the face portion 55 between the wings 61 and 63. The relationship of the shield 53 with respect to the posts 45 and 45' is easily changed by simply loosening the wing nuts on the bolts 77 and 77'. The shield 53 is then placed in the proper orientation and the wing nuts would then again be tightened. The position of the shield 53 with respect to the bars 31 and 31' may also be changed by simply inserting the bolt 41 in the desired openings 33 to move the shield 53 either rearwardly or forwardly with respect to the roof 11. When the vehicle is being used to pull a trailer, the shield 53 would be positioned in the manner illustrated in FIG. 3 so that the leading edge 57 is positioned below and forwardly of the trailing edge 59. In the orientation of FIG. 3, the wings 61 and 63 would extend rearwardly and downwardly with respect to the roof 11. As the vehicle is being driven down the highway, a large portion of the air currents passing over the roof 11 will be deflected upwardly by the inclined face portion 55 so that the air currents pass over the trailer at a position above the front 21 to reduce the wind resistance against the front portion of the trailer. Some of the air current passing over the roof 11 will pass beneath the leading edge 57 between the wings 61 and 63 which prevents objectionable vacuum pockets being formed rearwardly of the face portion 55. If vacuum pockets were allowed to form behind the face portion 55, the air passing over the shield 53 would tend to be drawn downwardly therebehind and to be directed against the forward portion of the trailer which would reduce the efficiency of the device. The wings 61 and 63 also aid in deflecting the air around the forward portion of the trailer 19 and the face portion 55 and the wings combined to effectively reduce the wind resistance at the forward portion of the trailer. The precise angle of the face portion 55 with respect to the roof 11 would be determined by the configuration of the vehicle windshield and roof as well as the speed at which the vehicle will be driven. Thus it can be seen that a unique deflecting device has been provided which may be mounted on the roof of a vehicle to reduce the wind resistance against the forward portion of a trailer being pulled by the vehicle. The reduced wind resistance increases gas mileage as well as making the vehicle operators task much easier. The transparent characteristic of the shield 53 provides an aesthetically attractive appearance but the transparent material could be replaced by metal material if the vehicle operator is not concerned about the appearance of the apparatus. Thus it can be seen that the device accomplishes at least all of its stated objectives.

Some changes may be made in the construction and arrangement of my air current deflecting device without departing from the real spirit and purpose of my invention, and it is my intention to cover by my claims, any modified forms of structure or use of mechanical equivalents which may be reasonably included within their scope.

I claim:

1. An air current deflecting device for a vehicle pulling a trailer, comprising, a support means adapted to be detachably secured to the vehicle roof, and an elongated deflecting shield means mounted on said support means spaced above the roof of said vehicle, said shield means having its longitudinal axis transverse to the direction of travel of said vehicle and having a face portion with leading and trailing edges, said trailing edge normally being positioned above and rearwardly of said leading edge so that said face portion deflects the air passing over the roof of said trailer, said support means being comprised of first and second support members detachably secured to said vehicle at opposite sides of the roof thereof, each of said support members including first and second resilient suction cup members mounted on the roof and having a bar secured thereto and extending therebetween, an upstanding post means secured to said bar and extending upwardly therefrom, said shield means being pivotally secured to the upstanding post means on said first and second support members inwardly of the outer ends of said shield means.

2. The device of claim 1 wherein said post means is longitudinally adjustably mounted on said bar, and wherein said post means is length adjustable whereby the relationship of said leading edge of said shield means with respect to the vehicle roof may be changed.

3. The device of claim 2 wherein said shield means has a pair of spaced-apart braces secured thereto, said braces being pivotally secured to said post means, said braces having an arm member secured thereto and extending therebetween at the rearward side of said shield means.

4. In combination with a vehicle towing a trailer therebehind, said vehicle having a top, a support means secured to the vehicle, an elongated deflecting shield means mounted on said support means spaced above said vehicle top, said shield means having its longitudinal axis transverse to the direction of travel of said vehicle and having a face portion with leading and trailing edges, said trailing edge normally being positioned above and rearwardly of said leading edge so that said face portion deflects air passing thereover at least upwardly over the forward portion of the trailer, said leading edge being spaced above said vehicle top so that air will pass below said shield means to prevent the formation of objectionable vacuum pockets rearwardly of said shield means, said shield means being selectively vertically secured to said support means to permit the selective spacing of said leading edge with respect to the vehicle top to vary the amount of air flowing between said vehicle top and said leading edge.

5. The combination of claim 4 wherein said shield means includes a pair of wing portions extending rearwardly from opposite ends of said face portion, said face portion having a length substantially equal to the width of said vehicle top so that said wing portions are positioned adjacent the opposite sides of the vehicle respectively.

6. The combination of claim 4 wherein said shield means is pivotally secured to said support means about a horizontal axis which is transverse to the direction of travel of the vehicle, said shield means being pivotally movable to an inoperative position whereby said face portion is substantially parallel to said vehicle top.